(12) United States Patent
Fukui

(10) Patent No.: US 12,441,093 B2
(45) Date of Patent: Oct. 14, 2025

(54) VEHICULAR INTERIOR MATERIAL AND SEAT BACK PANEL

(71) Applicant: KOTOBUKIYA FRONTE CO., LTD., Tokyo (JP)

(72) Inventor: Kazuki Fukui, Gyoda (JP)

(73) Assignee: KOTOBUKIYA FRONTE CO., LTD., Tokyo (JP)

( * ) Notice: Subject to any disclaimer, the term of this patent is extended or adjusted under 35 U.S.C. 154(b) by 45 days.

(21) Appl. No.: 18/015,564

(22) PCT Filed: Dec. 13, 2021

(86) PCT No.: PCT/JP2021/045748
§ 371 (c)(1),
(2) Date: Jan. 11, 2023

(87) PCT Pub. No.: WO2022/138265
PCT Pub. Date: Jun. 30, 2022

(65) Prior Publication Data
US 2023/0311459 A1    Oct. 5, 2023

(30) Foreign Application Priority Data
Dec. 22, 2020 (JP) .................. 2020-212874

(51) Int. Cl.
*B32B 27/08* (2006.01)
*B32B 27/30* (2006.01)

(52) U.S. Cl.
CPC ............ *B32B 27/08* (2013.01); *B32B 27/304* (2013.01); *B32B 2255/10* (2013.01); *B32B 2255/26* (2013.01); *B32B 2605/003* (2013.01)

(58) Field of Classification Search
None
See application file for complete search history.

(56) References Cited

U.S. PATENT DOCUMENTS

2021/0309164 A1   10/2021   Fukui

FOREIGN PATENT DOCUMENTS

| JP | 2020-121551 A | | 8/2020 |
|---|---|---|---|
| KR | 20190009893 A | * | 1/2019 |
| WO | 2020/054050 A1 | | 3/2020 |

OTHER PUBLICATIONS

Machine translation of KR 20190009893 A (Year: 2019).*
International Search Report of PCT/JP2021/045748 dated Feb. 1, 2022 [PCT/ISA/210].

* cited by examiner

*Primary Examiner* — Ramsey Zacharia
(74) *Attorney, Agent, or Firm* — Sughrue Mion, PLLC

(57) ABSTRACT

This vehicular interior finishing material has a layered structure including n layers (where n is a natural number equal to or greater than 2), and at least includes a substrate that is a first layer and a skin layer that is an nth layer. The vehicular interior finishing material is configured such that formula (1) is satisfied, where di (mm) is the thickness of an i-th layer, Ei (MPa) is the Young's modulus, and ρ (g/cm3) is the density of the entire vehicular interior finishing material. In addition, this seat back panel is formed using the vehicular interior finishing material.

$$94 < \sqrt{\sum_{i=1}^{n}(Ei \times di)^2} < 1000 \times \left(\sum_{i=1}^{n} di\right) \times \rho \quad (1)$$

19 Claims, 3 Drawing Sheets

$$\alpha = \sqrt{(E1 \times d1)^2 + (E2 \times d2)^2}$$

| Sample Number | Material | $\alpha = \sqrt{(E1 \times d1)^2 + (E2 \times d2)^2}$ | $\beta = 1000(d1 + d2)\rho$ | Shape Retention | Sound |
|---|---|---|---|---|---|
| A | PP | 3104 | 2700 | OK | 64.4 |
| B | Laminated structure | 94.7 | 1522 | OK | 49.8 |
| C | Laminated structure | 2990 | 3133 | OK | 65.1 |
| D | upholstered | 9.7 | 326 | NG | — |
| E | upholstered | 87 | 208.9 | NG | — |

VEHICULAR INTERIOR MATERIAL AND SEAT BACK PANEL

CROSS REFERENCE TO RELATED APPLICATIONS

This application is a National Stage of International Application No. PCT/JP2021/045748, filed Dec. 13, 2021, claiming priority to Japanese Patent Application No. 2020-212874, filed Dec. 22, 2020.

FIELD

The present application relates to a vehicle interior material for a vehicle and a seat back panel using the same.

BACKGROUND

Conventionally, a seat back panel formed by injection molding of PP (polypropylene), for example, has been known as a seat back panel of a vehicle. Further, for example, PTL 1 describes a press-molded body which is usable as a seat back of a vehicle. The press-molded body in PTL 1 is a cover which is fixed to a non-woven fabric via an adhesive layer, and PTL 1 describes that, as the cover, natural leather, synthetic leather, fabric, or the like is used.

CITATION LIST

Patent Literature

[Patent Literature 1] JP 2020-121551 A

SUMMARY

Technical Problem

In order to provide a luxurious cabin space, a vehicle interior material used as a material of a seat back panel or the like is required to have high rigidity to such an extent that a luxurious feeling in appearance can be ensured, and is desired to generate a low-pitched and high-quality hitting sound even when the hitting sound is generated. However, in general, when the rigidity of a material is increased, a hitting sound emitted from the material is high-pitched and lacks high-quality feeling. Therefore, it is desired to develop a vehicle interior material capable of achieving a high-quality feeling in both rigidity and hitting sound. In this respect, the press-molded body described in PLT 1 is intended to ensure ease of sewing and strength, and no consideration is given to the hitting sound from the press-molded body.

An object of the present application is to provide a vehicle interior material which is improved so as to satisfy a high-quality feeling in both appearance and hitting sound, and a seat back panel formed using the vehicle interior material.

Solution to Problem

In order to solve the above-described problems, in one aspect of the present application, a vehicle interior material has a laminated structure of n layers (where, n is a natural number of 2 or more) and includes at least a base material as a first layer and a cover layer as an n-th layer. When thickness of an i-th layer is di (mm), the Young's modulus of the i-th layer is Ei (MPa), and the densities of whole of the vehicle interior material is ρ (g/cm3), the vehicle interior material is configured so as to satisfy the following formula (1).

[Formula 1]
$$94 < \sqrt{\sum_{i=1}^{n}(Ei \times di)^2} < 1000 \times \left(\sum_{i=1}^{n} di\right) \times \rho \tag{1}$$

Further, a seat back panel according to other aspect of the present application is formed using any aspect of the vehicle interior material according to the present application.

Advantageous Effects

According to the vehicle interior material according to the present application, it is possible to emit a high-quality hitting sound even when a hitting sound is generated, while having a high-quality appearance by ensuring necessary rigidity. Further, a seat back panel formed by using the vehicle interior material is used for a seat of a vehicle, and a space in the vehicle can thereby be made luxurious.

DESCRIPTION OF EMBODIMENTS

Figure 1:
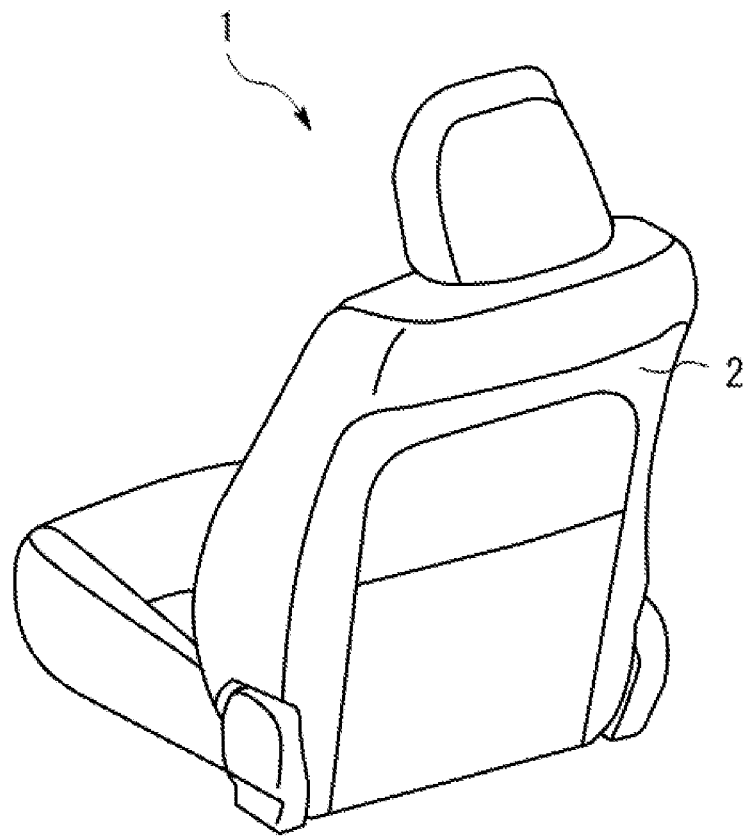
FIG. 1 is a diagram illustrating an example of a seat disposed in a vehicle.

Embodiments of a vehicular interior material according to the present application will hereinafter be described with reference to drawings. Note that the same reference characters are given to the same or corresponding components in the drawings, and descriptions thereof will be simplified or will not be repeated.

First Embodiment

FIG. 1 is a diagram illustrating one example of a seat arranged in a vehicle. As illustrated in FIG. 1, for example, a vehicular interior material 10 according to the present embodiment is used as a material for a seat back panel 2 of a seat 1 for a vehicle. The seat back panel 2 is positioned in a conspicuous place in front of a person seated on, particularly, a rear seat and occupies a large area in a vehicle cabin, and the hands and feet of the person are easily hit, so that striking noise is likely to be generated. Consequently, the vehicular interior material 10 according to the present embodiment is applied to the seat back panel 2, and an external appearance of a vehicle cabin space can thereby effectively be made luxurious, and to effectively suppress the occurrence of vulgar hitting sound.

However, the vehicle interior material 10 can be suitably used for other parts installed in a vehicle, in particular, a part touched by a human hand or a part easily noticed by a human. Specifically, the vehicle interior material 10 can be used as a material constituting all or part of, for example, a dashboard, an instrument panel, a door trim, a pillar trim, a rear parcel shelf, and the like, in addition to a seat back panel.

Figure 2:
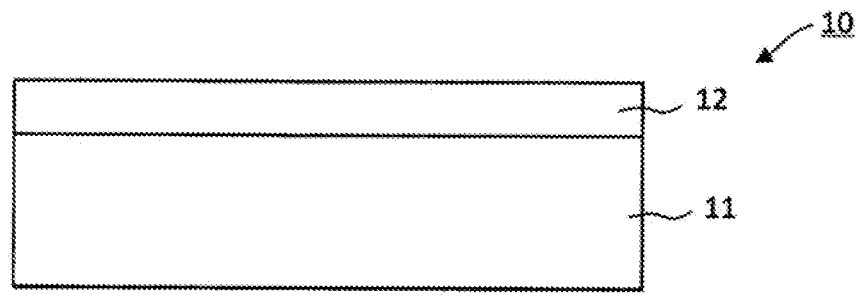
FIG. 2 is a diagram schematically illustrating a cross-sectional configuration of a vehicle interior material according to a first embodiment in the present application.

FIG. 2 is a diagram schematically illustrating a cross-sectional configuration of the vehicle interior material according to the present embodiment. As shown in FIG. 2, the vehicle interior material 10 has a laminated structure in which a base material 11 and a skin layer 12 are bonded to each other.

As the base material 11, a relatively light material whose composition is adjusted so as to ensure necessary rigidity is used, and sufficient strength of the vehicle interior component is ensured by the base material 11. In addition, the base material 11 is formed using a material that is lighter (lower in density) than at least the skin layer 12. Specifically, as the material of the base material 11, for example, fibers, felt such as compressed felt or knitted felt, foamed resin such as foamed urethane, a hollow structure of resin (for example, a honeycomb structure), or the like is used. In addition, the base material 11 may have a configuration in which the felt and a resin or the like are laminated.

The skin layer 12 is made of, for example, synthetic leather containing PVC (polyvinyl chloride). Here, the synthetic leather containing PVC includes synthetic leather composed only of PVC and synthetic leather containing PVC as a main component. Synthetic leathers containing PVC as a main component include, for example, PVC having a surface coated with a resin such as nylon or polyurethane. The skin layer 12 may be made of, for example, synthetic leather including other materials such as PP (polypropylene), fibers such as nonwoven fabric and woven fabric, natural leather, or the like. By using these materials, the appearance of the vehicle interior material 10 can be provided with a luxurious appearance.

Figures 3, 4:
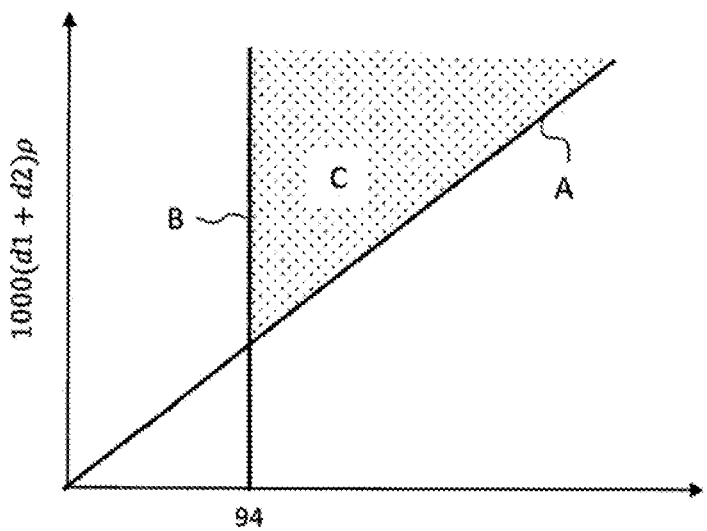
FIG. 3 is a diagram illustrating an outline of a relationship satisfied by a base material and a cover layer of the vehicle interior material according to the first embodiment in the present application.
FIG. 4 is a diagram illustrating measured values of a plurality of specific samples of a vehicle interior material and experimental results of shape retention force and sound volume.

FIG. 3 is a diagram for explaining an outline of a relationship satisfied by the base material 11 and the skin layer 12 of the vehicle interior material 10 according to the first embodiment. In FIG. 3, the horizontal axis represents the value of a shown in Expression (2). In Expression (2), d1 (mm) represents the thicknesses of the base material 11, d2 (mm) represents the thicknesses of the skin layer 12, E1 (MPa) represents the Young's modulus of the base material 11 at room temperature (5(° C.) to 35(° C.)), and E2 (MPa) represents the Young's modulus of the skin layer 12 at room temperature (5(° C.) to 35(° C.)).

[Formula 2]

$$\alpha = \sqrt{(d1 \times E1)^2 + (d2 \times E2)^2} \quad (2)$$

On the other hand, the vertical axis represents the value of β shown in the following equation (3). In Expression (3), ρ (g/cm3) represents the average density of the entire vehicle interior material 10.

[Formula 3]

$$\beta = 1000(d1+d2)\rho \quad (3)$$

The vehicle interior material of the present embodiment is configured to belong to a region C sandwiched between the solid line A and the solid line B. Specifically, a in the above formula (2) is a value correlated with the rigidity of the material. That is, the smaller the value of α, the lower the rigidity, and if the value of α is excessively small, it becomes difficult to maintain the shape, and the interior material lacks a luxurious feeling. In the present embodiment, the minimum value of α, that is, the range of the solid line B in FIG. 3 is specified, and a of the vehicle interior material 10 is set in a range larger than the solid line B, as will be described later, from the viewpoint of ensuring the rigidity necessary for producing the luxurious appearance.

In general, the higher the rigidity, the higher the tone of the striking sound from the material, and the larger the mass, the lower the tone of the striking sound. From this point of view, the inventor of the present application considered that the ratio between the mass and the rigidity has a certain correlation with the height of the hitting sound from the material, that is, the frequency, and as a result of research, found that the ratio β/α can be a parameter indicating the height of the hitting sound.

Specifically, when the value of the ratio β/α is small, the hitting sound generated from the material is a sound having a high frequency and lacking quality. Therefore, in the present embodiment, the value of the ratio β/α in the range allowable as the hammering sound, that is, the inclination of the solid line A in FIG. 3 is specified, and the value of the ratio β/α of the vehicle interior material 10 is set to be larger than the inclination of the solid line A.

FIG. 4 is a diagram illustrating values of α and β, shape retention force, and sound volume of a plurality of specific samples of the vehicle interior material confirmed by an experiment. In FIG. 4, in the column of "sound" in the rightmost column, the sound pressure level in the 1 m immediately above when the material is vibrated at 10 (N) is shown.

Sample A in FIG. 4 is a conventional interior material injection molded from PP. As shown in FIG. 4, the value of α of the conventional vehicle interior material is 3104. In the case of Sample A made of PP, the value of α was sufficiently large, and the shape retention force was sufficient. However, β was 2700 and the ratio β/α was relatively small at about 0.87, and it was confirmed that a high-pitched hitting sound was generated.

Sample B has α=94.7 and β=1522. Sample B had a smaller value of α than Sample A consisting of PP, but was judged to be acceptable from the standpoint of shape retention. On the other hand, the ratio β/α was about 16.07, and the hitting sound was judged to be low-pitched and high-quality.

Figure 5:
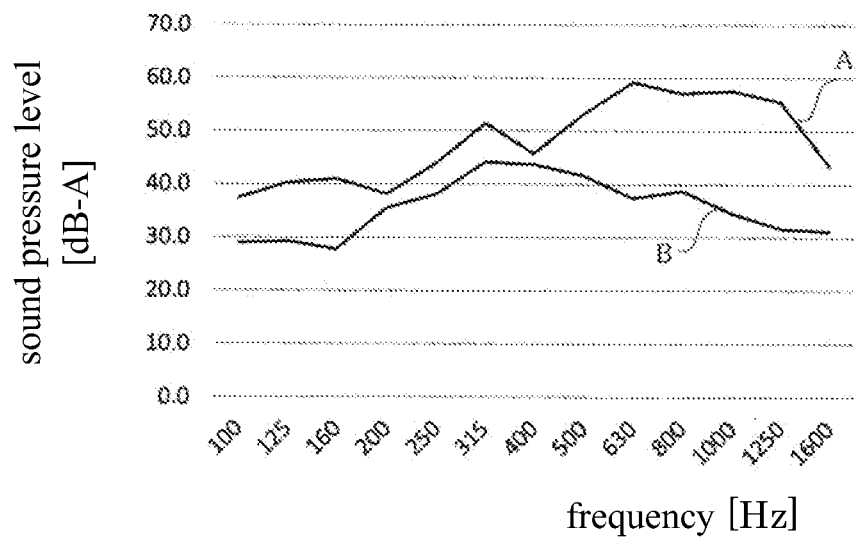
FIG. 5 is a graph illustrating a relationship between frequency and sound pressure level of striking sounds emitted from samples A and B of the vehicle interior material.

FIG. 5 illustrates the sound pressure level for each frequency component of the striking sound generated when the sample A and the sample B are vibrated at a constant intensity. It can be seen from FIG. 5 that the sound pressure level on the high frequency side of the sample B is sufficiently lower than that of the sample A made of the conventional PP. From this, it was confirmed that Sample B was a good vehicle interior material that emitted a low-pitched hitting sound.

In Sample C, α is 2990 and 13 is 3133. The value of α is larger as it is closer to the sample A made of PP, and is sufficient for shape retention. On the other hand, the ratio β/α was about 1.05, and it was determined that the hitting sound was in an allowable range of lower tones than PP.

Samples D and E are both examples of upholstered seat back panels. The ratios β/α of the samples D and E are sufficiently small at about 33.61 and about 2.40, respectively, and the hitting sound is actually low. However, α was as small as 9.7 and 87, respectively, and the shape retention force was judged to be less than the allowable range.

Experiments using the samples described above were repeated, and from the viewpoint of rigidity, the range of α of the vehicle interior material 10 of the present embodiment was specified to be greater than 94. In addition, from the viewpoint of the hitting sound, the range of the ratio β/α of the vehicle interior material 10 of the present embodiment was specified as being larger than 1, that is, α was specified as being smaller than β. That is, the vehicle interior material 10 of the present embodiment is configured so as to satisfy the relationship of the following formula (4).

[Formula 4]

$$94 < \sqrt{(d1 \times E1)^2 + (d2 \times E2)^2} < 1000 \times (d1+d2) \times \rho \quad (4)$$

In Expressions (2) and (4) above, the Young's modulus at normal temperature of 5(° C.) to 35(° C.) is used for the definition. This means that the relationship of the above formula (4) is satisfied even when the calculation is performed using the Young's modulus at any temperature as long as the temperature is within the normal temperature range of 5(° C.) to 35(° C.). However, if the vehicle interior material 10 satisfies the relationship of Expression (4) in the normal temperature range, the luxurious feeling of both the rigidity and the hitting sound can be satisfied to some extent even in a high-temperature environment outside the normal temperature range, for example, at a maximum temperature of 80(° C.). in the heat cycle test. When the base material 11 or the skin layer 12 is a hollow structure or the like, the Young's modulus may be anisotropic. In that case, the Young's modulus in either of the different directions is used.

As described above, in the vehicle interior material 10 according to the present embodiment, the base material 11 and the skin layer 12 satisfy the relationship specified by the thicknesses d1 and d2, the Young's moduli E1 and E2, and the densities ρ described above, and thus the vehicle interior material 10 has a good appearance and emits a striking sound that does not impair a sense of luxury. Therefore, by using the vehicle interior material 10 as an interior component of a vehicle, a luxurious feeling can be imparted to the appearance of the interior of the vehicle, a low-pitched and high-quality sound can be obtained even when a striking sound is generated, and a luxurious feeling of the interior of the vehicle can be produced as a whole.

Second Embodiment

Figure 6:
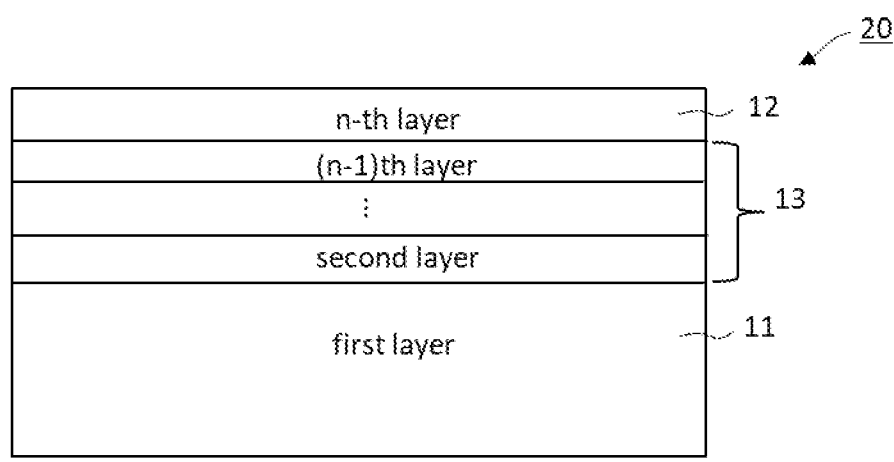
FIG. 6 is a view schematically illustrating a cross-sectional configuration of a vehicle interior material according to second embodiment in the present application.

FIG. 6 is a diagram schematically showing a cross-sectional configuration of a vehicle interior material according to Embodiment 2. In Embodiment 1, the case where the vehicle interior material 10 is configured by two layers of the base material 11 and the skin layer 12 has been described. On the other hand, as shown in FIG. 6, the vehicle interior material 20 according to the second embodiment has n−2 intermediate layers between the base material 11 and the skin layer 12. That is, the vehicle interior material 20 is a laminated structure of n layers as a whole. Here, n is a natural number greater than or equal to 3. For convenience, the base material 11 is referred to as a first layer, the intermediate layers are referred to as a second layer, a third layer, and an (n−1)-th layer in order from the base material 11 side, and the skin layer 12 is referred to as an n-th layer.

The intermediate layer 13 is disposed for adhesion between the base material 11 and the skin layer 12 and reinforcement of the vehicle interior material 10. As the intermediate layer 13, for example, a resin sheet, nonwoven fabric, fiber, PP, or the like is used. The number of stacked intermediate layers 13 is not limited.

The vehicle interior material 20 is configured so as to satisfy the relationship of the following formula (5) similarly to the above formula (4). In Formula (5), the thicknesses of the layers from the base material 11, which is the first layer, to the n-th layer, which is the skin layer 12, are represented by di (mm), the Young's modulus of each of those layers at 5 to 35 (° C.) is represented by) Ei (MPa), and the average of the overall densities is represented by ρ (g/cm3).

[Formula 5]

$$94 < \sqrt{\sum_{i=1}^{n}(Ei \times di)^2} < 1000 \times \left(\sum_{i=1}^{n} di\right) \times \rho \quad (5)$$

Even in a case where the vehicle interior material 20 has a laminated structure of three or more layers, by configuring the vehicle interior material 20 so as to satisfy the relationship of the above formula (5), it is possible to realize both a luxurious appearance and a high-quality hitting sound of the vehicle interior material 20. Therefore, by using the vehicle interior material 20 as an interior component of a vehicle, a luxurious feeling can be imparted to the appearance of the interior of the vehicle, and a low-pitched and high-quality sound can be obtained even when a striking sound is generated, and a luxurious feeling of the interior of the vehicle as a whole can be produced.

The Young's modulus at the normal temperature of 5(° C.) to 35(° C.) is also used in the above formula (5), and the relation of the above formula (4) is satisfied even when the calculation is performed by using the Young's modulus at any temperature within the range of the normal temperature of 5(° C.) to 35(° C.). When a hollow structure or the like is used in any of the layers and the Young's modulus thereof has anisotropy, the Young's modulus in any of the different directions is used.

When reference is made to a number such as the number, quantity, amount, range, or the like of each element in the above-described embodiments, the present invention is not limited to the number mentioned unless otherwise specified or unless clearly specified to the number in principle. In addition, structures and the like described in the embodiments are not necessarily essential to the present invention except for a case where the structures and the like are clearly specified in particular or a case where the structures and the like are obviously specified in principle.

REFERENCE SIGNS LIST

1 sheet
2 seat back panel
10, 20 vehicle interior material
11 base material
12 cover layer
13 intermediate layer

The invention claimed is:

1. A vehicle interior material which has a laminated structure of n layers (where, n is a natural number of 2 or more), the vehicle interior material comprising: at least,
a base material which is a first layer and which is formed of felt, foamed resin, or a hollow structure of resin; and
a cover layer which is an n-th layer, wherein, the vehicle interior material is configured to satisfy a relationship of Formula (1):

$$94 < \sqrt{\sum_{i=1}^{n}(Ei \times di)^2} < 1000 \times \left(\sum_{i=1}^{n} di\right) \times \rho \quad (1)$$

where, among the first to the n-th layers, the thickness of an i-th layer is di (mm), the Young's modulus of the i-th layer is Ei (MPa), and the density of whole of the vehicle interior material is $\rho$ (g/cm³).

2. The vehicle interior material according to claim 1, wherein the base material is formed of a hollow structure of resin.

3. The vehicle interior material according to claim 1, wherein the cover layer is formed of synthetic leather, non-woven fabric, woven fabric, or natural leather.

4. The vehicle interior material according to claim 1, wherein, when the "n" is a natural number of 3 or more and when the vehicle interior material includes an intermediate layer of n−2 layer disposed between the cover layer and the base material, the intermediate layer includes a layer formed of any one of a resin sheet, a fiber, a non-woven fabric, and polypropylene.

5. A seat back panel formed using the vehicle interior material according to claim 1.

6. The vehicle interior material according to claim 2, wherein the cover layer is formed of synthetic leather, non-woven fabric, woven fabric, or natural leather.

7. The vehicle interior material according to claim 2, wherein, when the "n" is a natural number of 3 or more and when the vehicle interior material includes an intermediate layer of n−2 layer disposed between the cover layer and the base material, the intermediate layer includes a layer formed of any one of a resin sheet, a fiber, a non-woven fabric, and polypropylene.

8. The vehicle interior material according to claim 3, wherein, when the "n" is a natural number of 3 or more and when the vehicle interior material includes an intermediate layer of n−2 layer disposed between the cover layer and the base material, the intermediate layer includes a layer formed of any one of a resin sheet, a fiber, a non-woven fabric, and polypropylene.

9. A seat back panel formed using the vehicle interior material according to claim 2.

10. A seat back panel formed using the vehicle interior material according to claim 3.

11. A seat back panel formed using the vehicle interior material according to claim 4.

12. The vehicle interior material according to claim 1, wherein the base material is formed of felt.

13. The vehicle interior material according to claim 12, wherein the cover layer is formed of synthetic leather, non-woven fabric, woven fabric, or natural leather.

14. The vehicle interior material according to claim 12, wherein, when the "n" is a natural number of 3 or more and when the vehicle interior material includes an intermediate layer of n−2 layer disposed between the cover layer and the base material, the intermediate layer includes a layer formed of any one of a resin sheet, a fiber, a non-woven fabric, and polypropylene.

15. A seat back panel formed using the vehicle interior material according to claim 12.

16. The vehicle interior material according to claim 1, wherein the base material is formed of foamed resin.

17. The vehicle interior material according to claim 16, wherein the cover layer is formed of synthetic leather, non-woven fabric, woven fabric, or natural leather.

18. The vehicle interior material according to claim 16, wherein, when the "n" is a natural number of 3 or more and when the vehicle interior material includes an intermediate layer of n−2 layer disposed between the cover layer and the base material, the intermediate layer includes a layer formed of any one of a resin sheet, a fiber, a non-woven fabric, and polypropylene.

19. A seat back panel formed using the vehicle interior material according to claim 16.

* * * * *